Mar. 27, 1923.
T. A. PATTERSON
NUT LOCK
Filed Sept. 24, 1921
1,450,048
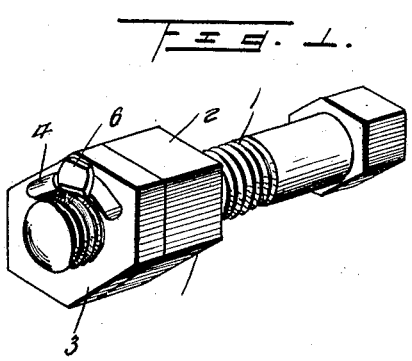
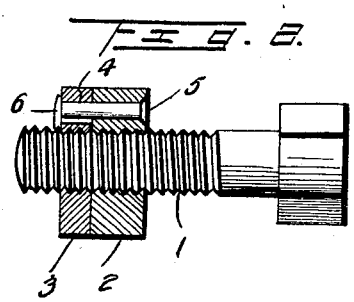 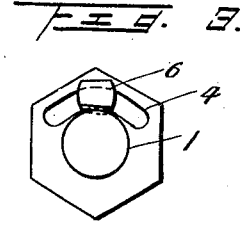
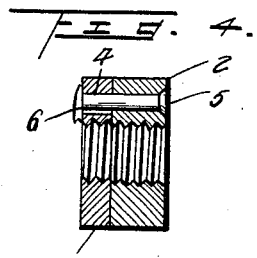
Mary S. Patterson
Administratrix of the Estate of
Thomas A. Patterson, Inventor, Deceased.
By *(signature)*
Attorney Patented Mar. 27, 1923.

1,450,048

UNITED STATES PATENT OFFICE.

THOMAS A. PATTERSON, DECEASED, BY MARY S. PATTERSON, ADMINISTRATRIX, OF FRIERSON, LOUISIANA.

NUT LOCK.

Application filed September 24, 1921. Serial No. 502,894.

*To all whom it may concern:*

I, MARY S. PATTERSON, a citizen of the United States, residing at Frierson, in the parish of De Soto and State of Louisiana, administratrix of the estate of THOMAS A. PATTERSON, deceased, do hereby declare that the said THOMAS A. PATTERSON invented certain new and useful Improvements in a Nut Lock, and do hereby declare the following to be a full, clear, and exact description of the said invention, such as will enable others skilled in the art to which it appertains to make and use the same.

The invention relates to fastenings of every description embodying a threaded connecting member and a confining nut or burr mounted thereon and has for its object to secure the nut in the required adjusted position against loosening or displacement.

The invention is particularly designed for bolts intended for use in the construction of railways, bridges and other structures which are subjected to vibration and contraction and expansion due to climatic conditions such as cold and heat.

The invention consists of a lock nut associated with the usual confining nut and connected thereto by a pin and slot connection, whereby the two are always at hand and prevented from displacement.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification.

Figure 1 is a perspective view of a bolt and nut provided with a lock embodying the invention showing the lock in neutral position.

Figure 2 is a sectional detail.

Figure 3 is an end view, and

Figure 4 a sectional detail of the nut and lock.

Corresponding and like parts are referred to in the following description and designated in the several views of the drawing by like reference characters.

The numeral 1 designates a threaded connecting member such as a bolt. And 2 represents a confining nut in cooperative relation therewith and mounted upon the threaded portion thereof for clamping the work to be made secure.

The lock 3 appears as a nut and is usually of less thickness than the confining nut 2 and operates in substantially the same manner as a jamb nut. The lock 3 binds the threads of the bolt or member 1 and may be turned to the right or left from a neutral position to attain this end. It is preferred however to turn the lock 3 so as to bind against the nut 2 and jam the thread of the bolt or member 1. The lock 3 is provided with a curved slot 4 exterior to and concentric with the threaded opening which receives the bolt or member 1. The slot 4 may be of any determinate length to insure a binding action of the lock 3 when turned in either position from a neutral point after the nut 2 has been properly adjusted. A pin 5 secured to the confining nut 2 passes loosely through the slot 4 and is provided at its outer end with the head 6 which extends beyond the side walls of the slot 4 and engages the lock 3 to retain it in position against casual displacement. When the pin 5 occupies a position midway the ends of the slot 4 the lock 3 is in neutral position and may be rotated freely with the nut 2 when placing the same upon the bolt or member 1 or removing it therefrom. When the lock 3 is in neutral position the threads in the openings of the parts 2 and 3 match perfectly so that the parts 2 and 3 may be turned as a unit, either on or off the member 1. When the nut 2 has reached the required adjusted position it is made secure by turning the lock 3 from a neutral position. When the lock 3 is advanced it binds against the nut 2 and when reversed or backed it binds against the edge 6 of the pin 5. Whether the lock 3 is turned forwardly or backwardly it operates by binding or jamming the thread of the member or bolt 1. When it is required to release the nut 2, the lock 3 is turned from a locking into a neutral position, this being determined by the position of the pin 5 with reference to the slot 4 and which position is reached when the pin 5 is disposed centrally or midway the ends of the slot 4.

Having thus described the invention, what I claim is:—

1. A nut lock comprising a confining nut and a coacting nut, the coacting nut having a slot extending therethrough and longitudinally with respect to its axis, a pin extending from the confining nut and passing loosely through said slot, said pin having a head, the coacting nut being confined between the confining nut and said head, and adapted to abut either of them according to the direction in which it is rotated.

2. A nut lock comprising a confining nut and a coacting nut, the coacting nut having an arcuate slot spaced from the bolt receiving opening therein and concentric with said opening, a pin extending from the confining nut and passing loosely through said slot, said pin having a head, the coacting nut being confined between the confining nut and said head, and adapted to abut either of them according to the direction in which it is turned.

In testimony whereof, I affix my signature in presence of two witnesses.

MARY S. PATTERSON,
*Administratrix of the estate of Thomas A. Patterson, deceased.*

Witnesses:
D. T. BROWN,
J. W. PARSONS.